(12) United States Patent
Willey

(10) Patent No.: US 8,182,234 B2
(45) Date of Patent: May 22, 2012

(54) SPACEFRAME WIND TURBINE ENERGY CONVERTER STRUCTURE

(75) Inventor: Lawrence Donald Willey, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 986 days.

(21) Appl. No.: 12/169,766

(22) Filed: Jul. 9, 2008

(65) Prior Publication Data

US 2010/0007149 A1   Jan. 14, 2010

(51) Int. Cl.
  *F04D 29/00*   (2006.01)
  *F03D 11/00*   (2006.01)
  *F03B 11/00*   (2006.01)
  *F01D 5/00*   (2006.01)
  *F01D 25/00*   (2006.01)

(52) U.S. Cl. ............ 416/244 R; 415/4.5; 52/40; 290/44; 290/55

(58) Field of Classification Search .............. 290/44, 290/55; 52/40; 415/4.5; 416/244 R
See application file for complete search history.

(56) References Cited

U.S. PATENT DOCUMENTS

| 2007/0114798 | A1  | 5/2007  | Cairo |
| 2007/0274838 | A1* | 11/2007 | Bagepalli et al. ......... 416/245 R |
| 2008/0069684 | A1  | 3/2008  | Ihle |
| 2011/0097202 | A1* | 4/2011  | de Buhr et al. ............... 415/201 |

* cited by examiner

*Primary Examiner* — J. H. Hur
(74) *Attorney, Agent, or Firm* — McNees Wallace & Nurick LLC

(57) ABSTRACT

A wind turbine that includes a spaceframe mounted atop a support structure is provided. The spaceframe houses and is integrated with a wind turbine drivetrain. The spaceframe transfers primary rotor loads and drivetrain torque to the support structure.

16 Claims, 12 Drawing Sheets

FIG. 13B  FIG. 13C

SPACEFRAME WIND TURBINE ENERGY CONVERTER STRUCTURE

FIELD OF THE DISCLOSURE

The disclosure is generally directed to a wind turbine structure, and more particularly to a compact drivetrain and nacelle including a space-frame for use in wind turbine generators.

BACKGROUND OF THE DISCLOSURE

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The blades are attached to a rotatable hub on the rotor. The blades transform mechanical wind energy into a mechanical rotational torque that drives one or more generators. The generators are generally, but not always, rotationally coupled to the rotor through a gearbox. The gearbox steps up the low rotational speed of the turbine rotor for the generator to efficiently convert the rotational mechanical energy to electrical energy, which is fed into a utility electric power grid. The rotor, generator, gearbox and other components are typically mounted on a heavy bedframe with a housing, or nacelle, that is positioned on top of a tower that may be a truss or tubular tower.

The nacelle structure is generally formed of a cast or otherwise solid fabricated metal housing bedframe or bedplate, which introduces substantial weight a the top of the wind turbine tower. Furthermore, the heavy bedplate-nacelle structure includes load support features to support internal drive train components within the nacelle. The load support features add additional weight to the nacelle structure and the drivetrain component housings. Additionally, load support features may not effectively transfer loads and stresses within the bedplate-nacelle housing to be transferred to the tower, and also may introduce unwanted loads and stresses to the drivetrain components themselves. The increased weight increases capital costs, logistics, and operational cost of the wind turbine. Today's state-of-the-art wind turbines use a heavy bedframe design and the nacelle. The nacelle is a non-load bearing enclosure used primarily to keep the weather from directly impacting the individual components of the drivetrain.

What is needed is a highly integrated spaceframe and compact drivetrain that replaces the bedplate-nacelle structure, which reduces weight and efficiently transfers rotor operational loads, drivetrain torque and weight to the tower.

SUMMARY OF THE DISCLOSURE

One aspect of the present disclosure includes a wind turbine including a rotor, a drivetrain coupled to the rotor and a spaceframe housed atop a tower. The drivetrain is contained within the spaceframe, and the spaceframe is configured to carry primary rotor loads and drivetrain torque to the tower, thus eliminating the need for a heavy bedframe.

Another aspect of the present disclosure is a spaceframe for housing a wind turbine drivetrain. The spaceframe includes a structure configured to transfer drivetrain torque and primary rotor loads to a support structure.

Another aspect of the present disclosure includes a new type of nacelle, a spaceframe, for housing a wind turbine drivetrain atop a tower. The spaceframe is configured to transfer drivetrain torque and primary rotor loads to the tower. The spaceframe may be formed of stamped and/or punched metal sheet or plate or composite panels.

Another aspect of the present disclosure includes a nacelle for housing a wind turbine drivetrain atop a tower, the nacelle including a spaceframe configured to transfer drivetrain torque and primary rotor loads to the tower, the spaceframe formed of joined rails.

An advantage of the present disclosure is that integrated spaceframe and drivetrain enable substantially larger MW rating in the same or smaller nacelle space heretofore possible.

Another advantage of the present disclosure is that the integrated spaceframe and drivetrain design substantially reduces the overall weight of the drivetrain component housings, in addition to the weight savings directly from the spaceframe.

Another advantage of the present disclosure is that the integrated spaceframe and drivetrain design substantially reduces the overall combined weight of the integrated spaceframe and drivetrain assembly, resulting in the ability to transport larger MW rated components in the same or similar weight and size shipments as considerably smaller rated machines. For example, the current disclosure makes it practical to ship a 4 MW wind turbine in a conventional 1.5 MW to a 2.5 MW size package.

Another advantage of the present disclosure is that the integrated spaceframe and drivetrain design eliminates the need for the heavy cast bedplate and non-load bearing nacelle components of the prior art, thus increasing wind turbine supply sources, options, and supply volume.

Another advantage of the present disclosure is that the integrated spaceframe and drivetrain design is formed of repeating pattern, stamped and/or punched sheet or plate metal panels that are created using mature manufacturing methods similar to medium-to-heavy truck frame and automotive "uni-body" construction techniques and processes for design, fabrication, and automated assembly-line advantages.

Another advantage of the present disclosure is that the integrated spaceframe and drivetrain design is formed of a repeating pattern, stamped and/or punched sheet or plate panels that permit an arrangement of layers of the panels such that interior and exterior panel edge joints do not coincide, except at a point, yielding panels that are configured for improved loading, stiffness, lowest weight, and with the minimum number of panels for reduced tooling costs.

Another advantage of the present disclosure is that the integrated spaceframe and drivetrain design incorporates man-way, maintenance, and component servicing features directly into the spaceframe structure, resulting in load carrying and stress reducing interior structures accounted for in the overall spaceframe design.

Another advantage of the present disclosure is that the integrated spaceframe and drivetrain design incorporates thermal management passageways and other environmental system features including inlets and outlets directly into the spaceframe structure, resulting in load carrying and stress reducing interior structures in the overall spaceframe design.

Another advantage of the present disclosure is that the integrated spaceframe and drivetrain design incorporates circumferentially uniform rotor bearing support structures directly into the spaceframe structure, resulting in load carrying and stress reducing interior structures in the overall spaceframe design.

Another advantage of the present disclosure is that the integrated spaceframe and drivetrain design utilizes circumferentially uniform drivetrain torque transfer to cause operational stiffening of the spaceframe in lieu of traditional structural design features or adding weight to increase structural stiffness.

Another advantage of the present disclosure is that the integrated spaceframe and drivetrain design combines floor gratings, hand-rails, ancillary components, and all manner of previously considered non-load bearing components into the spaceframe structure, resulting in load carrying and stress reducing interior structures in the spaceframe design.

Another advantage of the present disclosure is that the integrated spaceframe and drivetrain design results in an overall lighter weight machine head and/or lighter top-head-mass that results in a wind turbine system benefit for lighter tower and/or foundation than would otherwise be required.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

FIGS. 13A, 13B, 13C, and 13D illustrates an exemplary integrated spaceframe and compact drivetrain outer or main shell after conversion from the 1D model over to the stamped and punched metal sheet or plate panel welded construction according to the disclosure.

Wherever possible, the same reference numbers will be used throughout the drawings to refer to the same or like parts.

DETAILED DESCRIPTION OF THE DISCLOSURE

Figure 1:
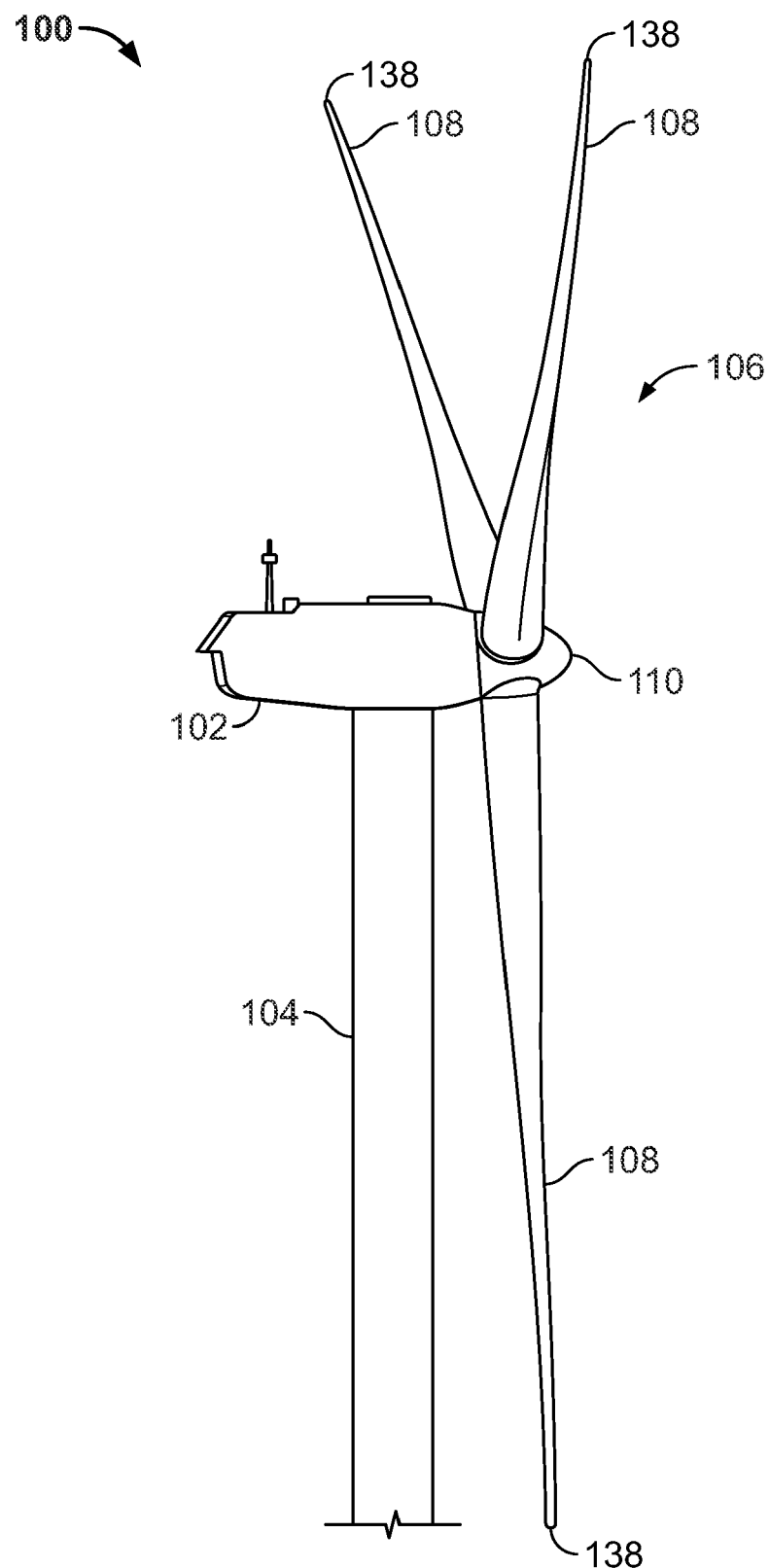
FIG. 1 shows a side elevation view of an exemplary wind turbine according to the prior art.

Referring to FIG. 1, an exemplary wind turbine 100 according to the present disclosure is disclosed. The wind turbine 100 includes a nacelle 102 mounted atop a tall tower 104, only a portion of which is shown in FIG. 1. Wind turbine 100 also includes a wind turbine rotor 106 that includes one or more rotor blades 108 with blade tips 138 attached to a rotating hub 110. In this exemplary embodiment, wind turbine 100 includes three rotor blades 138. In another embodiment, the wind turbine 100 may include one or more rotor blades 108. In yet another embodiment, there are no specific limits on the number of rotor blades 108.

Figure 2:
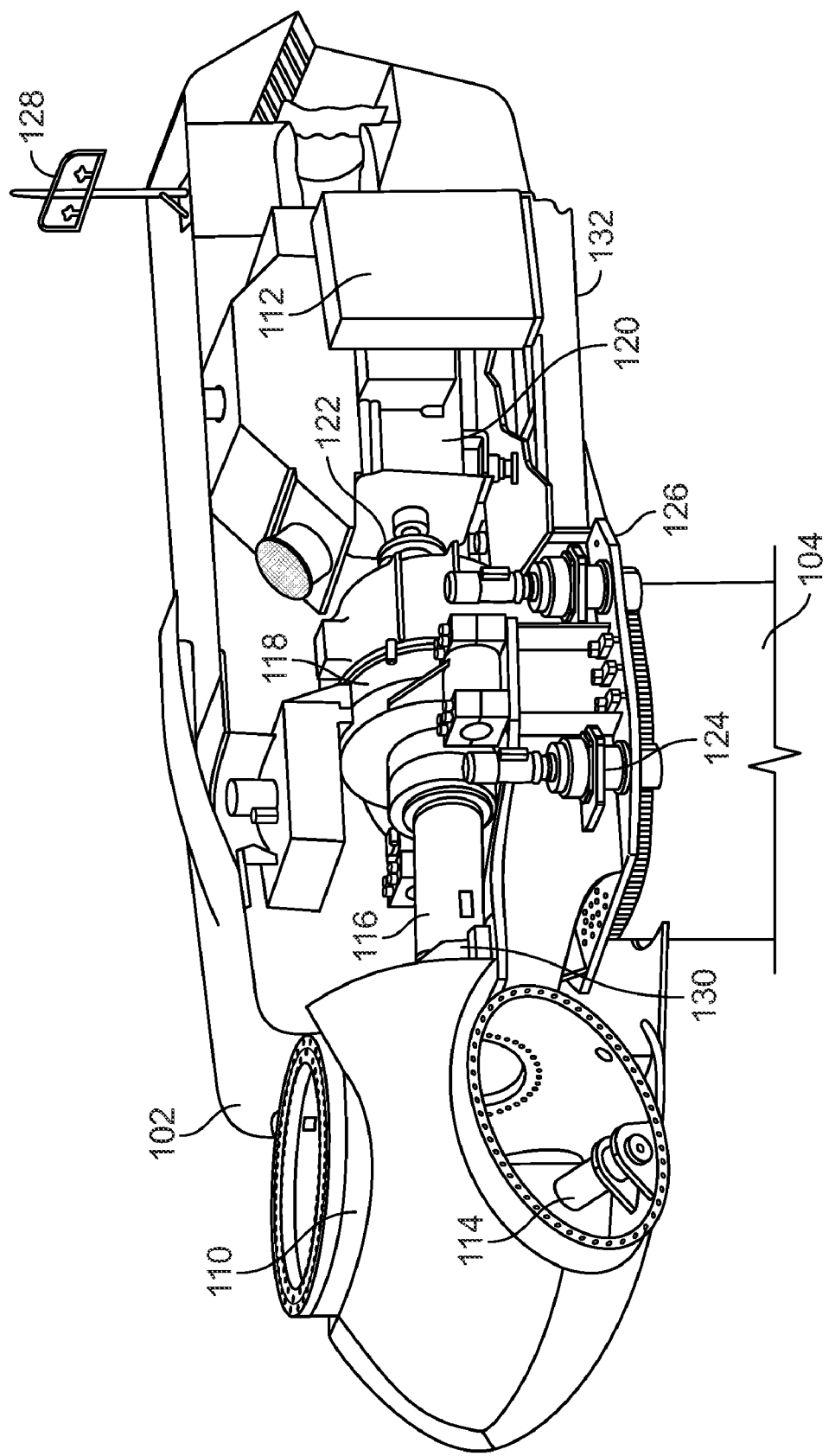
FIG. 2 shows a cut-away perspective view of the heavy bedplate and nacelle of the wind turbine shown in FIG. 1.

In some configurations and referring to FIG. 2, an exemplary configuration of various components that are housed in nacelle 102 atop tower 104 are shown. One or more microcontrollers (not shown) are housed within control panel 112. The microcontrollers include hardware and software configured to provide a control system providing overall system monitoring and control, including pitch and speed regulation, high-speed shaft and yaw brake application, yaw and pump motor application and fault monitoring. In alternative embodiments of the disclosure, the control system may be a distributed control architecture not solely provided for by the control panel 112. The control system provides control signals to a variable blade pitch drive 114 to control the pitch of blades 108 (FIG. 1) that drive hub 110 as a result of wind. In some configurations, the pitch angles of blades 108 are individually controlled by blade pitch drive 114.

The drive train of the wind turbine includes a main rotor shaft 116 (also referred to as a "low speed shaft") connected to hub 110 and supported by a main bearing 130 and, at an opposite end of shaft 116, to a gear box 118. In another embodiment, the main rotor shaft 116 is supported by two bearings (not shown) and the gear box 118 is supported by the main rotor shaft 116. Gear box 118, in some configurations, utilizes a dual path geometry to drive an enclosed high-speed shaft. The high-speed shaft (not shown in FIG. 2) is used to drive generator 120, which is mounted on mainframe 132. In some configurations, high-speed shaft torque is transmitted via coupling 122. Generator 120 may be of any suitable type, for example, a wound rotor induction generator.

Yaw drive 124 and yaw deck 126 provide a yaw orientation system for wind turbine 100. Anemometry provides information for the yaw orientation system, including measured instantaneous and time averaged wind direction and wind speed at the wind turbine. Anemometry may be provided by a wind vane 128. In some configurations, the yaw bearing system is mounted on a stationary flange (not shown) provided atop tower 104. The structure that includes the main bearing 130, the yaw deck 126, the mainframe 132, and associated support structure is typically referred to as the "bedplate" or "bedframe".

Figure 3:
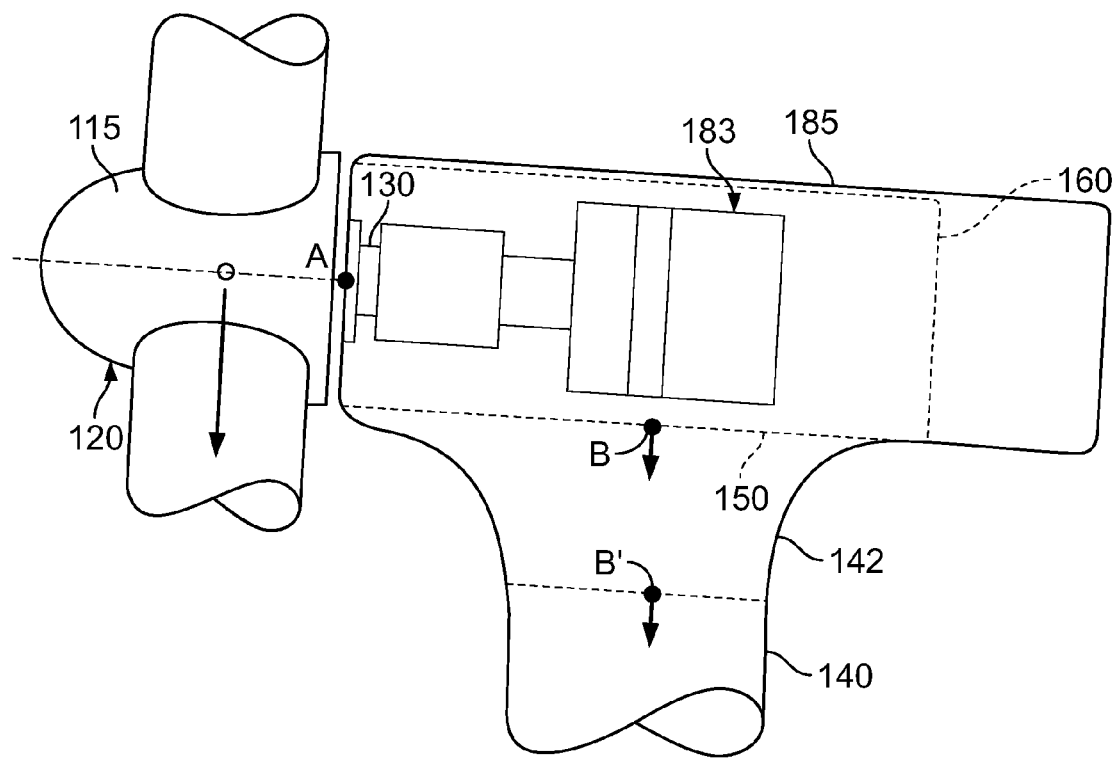
FIG. 3 shows a cut-away perspective view of an exemplary 4 MW Mechanical-Electrical Power Conversion (MEPC) compact drivetrain inside an exemplary design space of a prior art 1.5 MW or 2.5 MW nacelle structure.

FIG. 3 shows an exemplary 4 MW mechanical electrical power conversion (MEPC) compact drivetrain 183 according to the present disclosure. The MEPC compact geared drivetrain (CGDT) 183 is coupled to rotor 120. The MEPC CGDT is housed within a spaceframe 160. In this exemplary embodiment, spaceframe 160 includes a spaceframe transition piece 142, which connects the spaceframe 160 to tower 140. Point A is the interface between the rear of the rotor hub 115 and the front face of the main shaft 130 of the MEPC compact drivetrain 183. Point B' is the intersection of a spaceframe transition piece 142 with the tower 140. Point B is the point where a spaceframe 160 without a spaceframe transition piece 142 or a conventional nacelle, through it's yaw deck 132 (FIG. 2), would be attached to tower 140. In another embodiment, the spaceframe 160 may be constructed without a spaceframe transition piece 142 and the spaceframe may be attached to tower 140 at point B.

As can be seen in FIG. 3, the exemplary 4 MW MEPC compact drivetrain 183 occupies the outline 160 of a reduced volume 2.5 MW conventional nacelle 185, allowing for a larger MW capacity per unit volume of nacelle. In an alternate embodiment, the MEPC compact drivetrain 183 can occupy the volume within a 1.5 MW conventional bedframe and nacelle.

Figure 4:
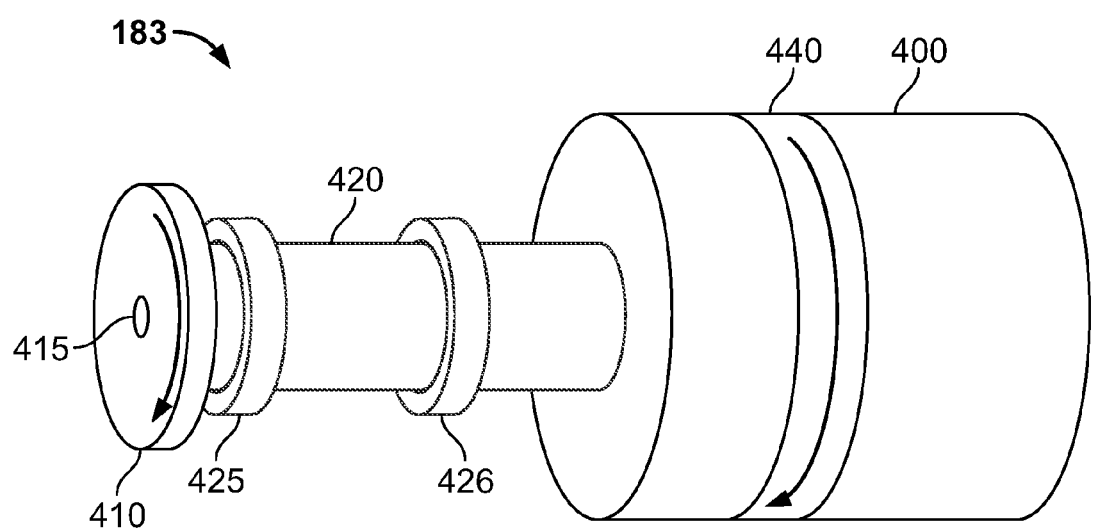
FIG. 4 shows a solid block outline of an exemplary MEPC compact drivetrain according to the disclosure.

The main elements of the MEPC compact drivetrain 183 are shown in FIG. 4. Starting at the left side is the hub-shaft flange 410, and the hub-to-main shaft interface 415 corresponding to Point A (FIG. 3), where the rotor loads are transferred into the main shaft 420 by way of hub-shaft flange 410. Two bearings 425, 426, known as bearing number 1 and bearing number 2, respectively, are used to transfer rotor loads to the spaceframe 160 (FIG. 3), which then transfers those loads to the tower 140 (FIG. 3). The main shaft 420 then continues into the MEPC integrated gearbox and generator 400. There are bearings internal to the MEPC gearbox and generator that allow shaft rotation relative to the fixed outer casing of the MEPC gearbox and generator.

The MEPC compact drivetrain 183 is not supported by the spaceframe (not shown) in the traditional sense of horizontal or vertical reactions, instead, the main shaft 420 performs this function. The MEPC compact drivetrain load that must be accommodated by the spaceframe is torque. For this example, a circumferential structural band 440 is shown where the torque load can be spread uniformly around the outside circumference of the MEPC compact drivetrain 183 and transferred more uniformly into the spaceframe. Torque transfer is possible because the spaceframe structural design encompasses the MEPC compact drivetrain all-around, as opposed to a heavy bedframe mounted underneath separately mounted drivetrain components.

By spreading the torque load around the circumference of the MEPC compact drivetrain 183 and into the spaceframe, the transfer linkages (not shown) are considerably smaller, and an overall lighter design is made possible for the corresponding reaction points as compared to a conventional bedframe/nacelle design that has gearbox torque transferred to the bedframe via one or two large and heavy lateral torque arms.

Figure 5:
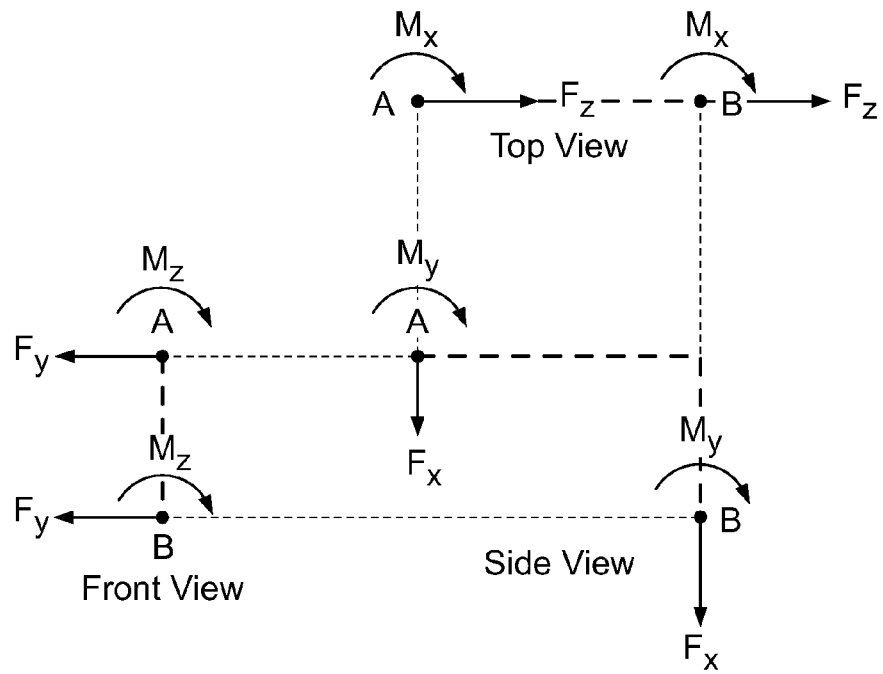
FIG. 5 shows forces and moments for the rotor loads transferred by the spaceframe and into the tower top with respect to pints A and B or A and alternate embodiment B', as shown in FIG. 3.

FIG. 5 shows exemplary forces and moments around Point A and Point B, and alternatively around Point B' (see FIG. 3). The forces $F_x$, $F_y$ and $F_z$ and the moments $M_x$, $M_y$ and $M_z$ are shown referenced to the x, y, z coordinate system shown on FIG. 6. As wind loads impact the rotor plane, the loads are transferred through Point A and conveyed to Point B (in the embodiment where the spaceframe 160 does not include spaceframe transition piece 142) (FIG. 3), or alternately to Point B' (in the embodiment where the spaceframe 160 includes spaceframe transition piece 142). In contrast, heavy bedframe nacelle designs accomplish the transfer of loads primarily via the main shaft, bearings, and gearbox components, with deleterious effect on the shaft bearings and gearbox life. The integrated spaceframe and MEPC compact drivetrain design eliminates the gearbox from the load path and passes these rotor loads more directly through the spaceframe structure down into the tower. The position of Point A, Point B and Point B' are exemplary, and in alternative embodiments, may be repositioned to account for change in structural geometry and/or component positioning.

Figure 6:
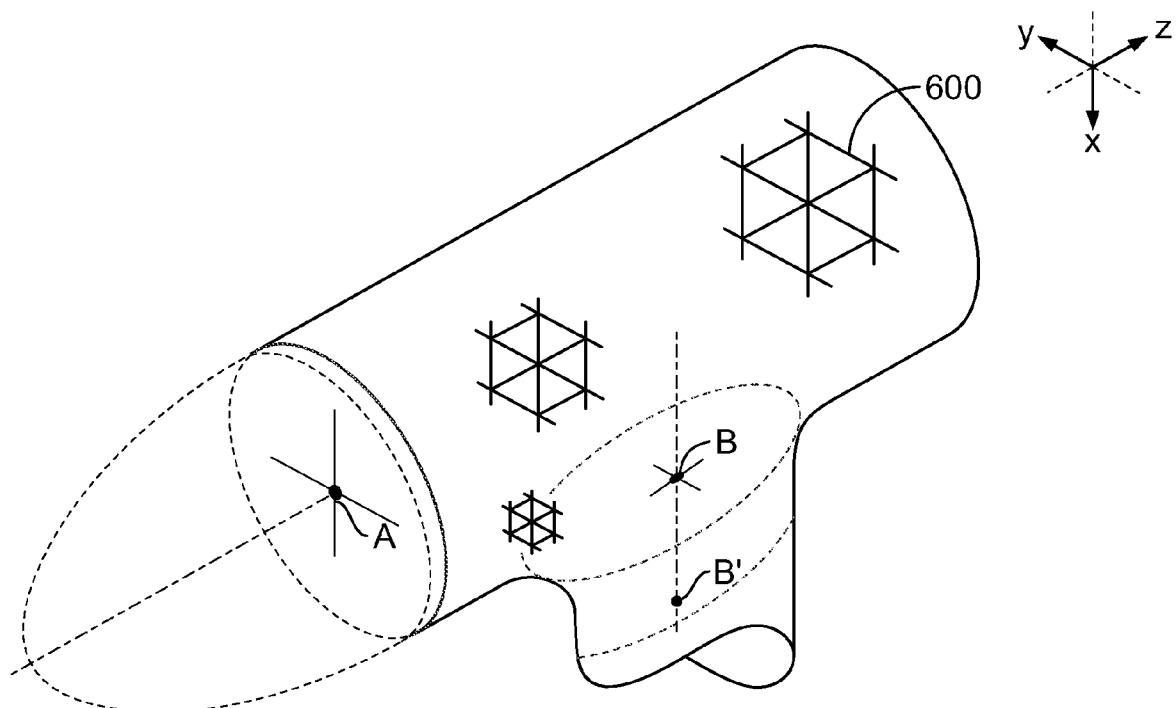
FIG. 6 shows an exemplary spaceframe design starting point for a size range of repeating pattern structural rail lengths and connecting nodes.

To arrive at the spaceframe stamped and punched sheet or plate metal definition, the first step is to create a network of nodes and rails that are used to make a first approximation of the spaceframe shell and interior component bridging. The basic repeating pattern may include a hexagon 600, made up of 6 equilateral triangles as shown in FIG. 6. These hexagons 600 are smoothly transitioned from one size pattern to another, and there is a vertical plane of symmetry along the drivetrain centerline. The rails themselves can be channel, pipe, or box sections. The nodes may be any suitable junction for the rails, and can be represented, for example, by spheres in the initial 1D Finite Element Analysis (FEA) model.

The repeating pattern of rail lengths and nodes is estimated based on the level of the major operational loads and the arrangement of the overall paths between Point A and Point B, or alternately Point B'. A finer network of spaceframe pattern elements may be used in areas of higher stress. Areas of lower stress use wider pattern spacing, but not too wide to negatively affect the outer shape of the finished frame. The pattern spacing must also consider the weather tight fabric covering that will eventually be stretched over the spaceframe. The patterns are then optimized for a number of FEA calculations to minimize stresses and deflections in the individual rails to a prescribed level of allowable values. Other degrees of freedom for the rails include regional customization of the rail cross-sections, material thickness, material specification, and other considerations.

Figure 7:
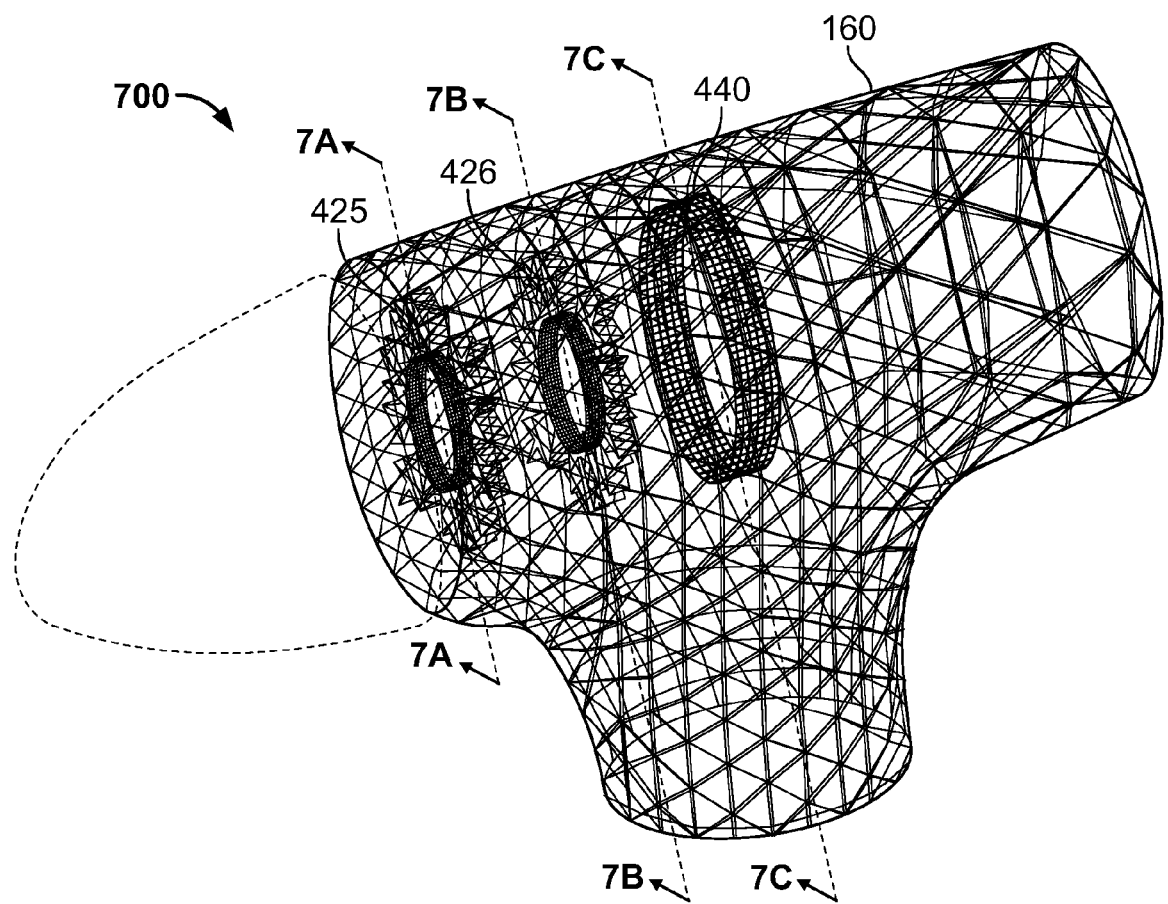
FIG. 7 shows an exemplary spaceframe design with an initial 1D model having the starting point connections between the bearings, MEPC compact drivetrain, and the spaceframe, before including interior load carrying structures for man-ways and ancillary equipment.
Figure 7A:
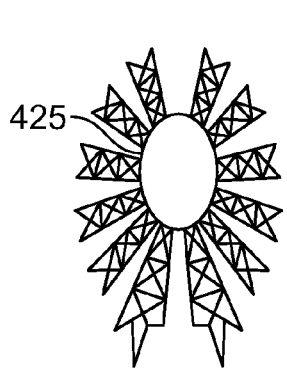
FIG. 7A shows the early spaceframe design around bearing #1 taken along line 7A-7A of FIG. 7.
Figure 7B:
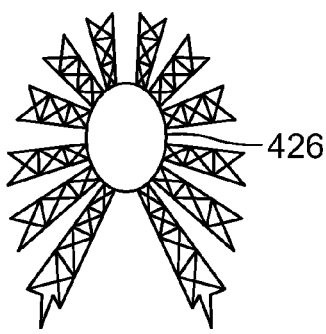
FIG. 7B shows the early spaceframe design around bearing #2 taken along line 7B-7B of FIG. 7.
Figure 7C:
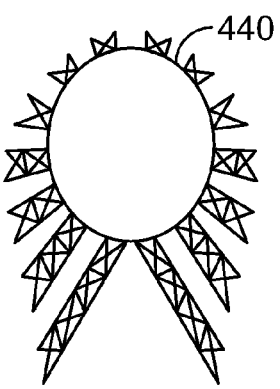
FIG. 7C shows the early spaceframe design around the MEPC taken along line 7C-7C of FIG. 7.
Figure 8:
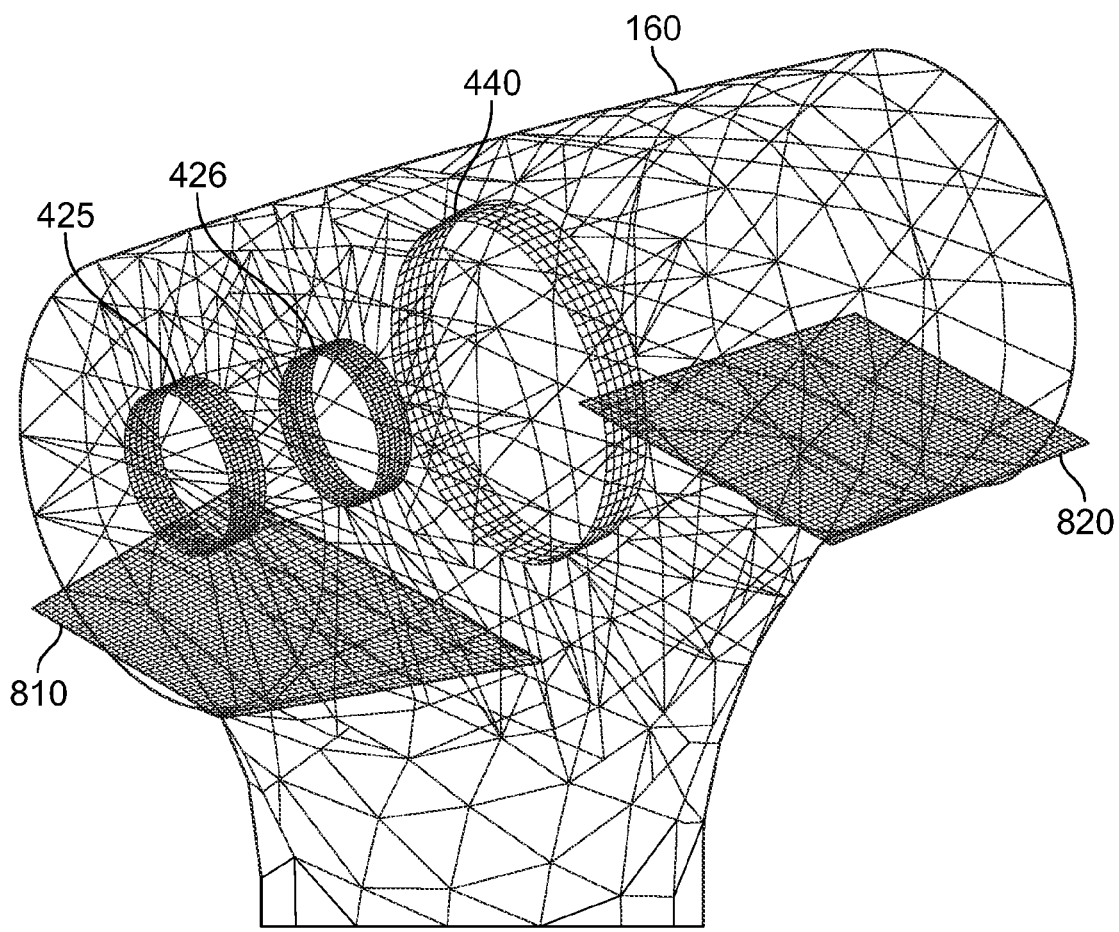
FIG. 8 shows an exemplary intermediate refined 1D model of the spaceframe design optimized for the MEPC and bearing locations having leveraged and directional cross-bridging to optimally distribute the full range of design load cases into the spaceframe.
Figure 8A:
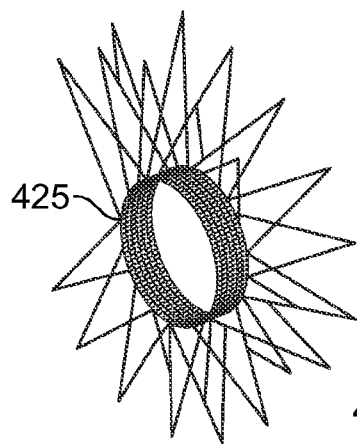
FIG. 8A shows the intermediate pin and cross joint spaceframe design around bearing #1.
Figure 8B:
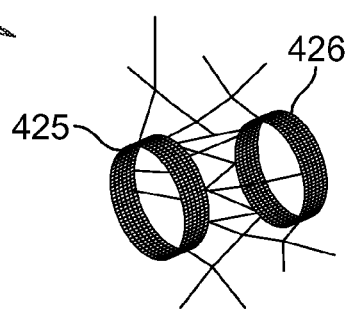
FIG. 8B shows the intermediate pin and cross joint spaceframe design around bearings #1 and #2.
Figure 8C:
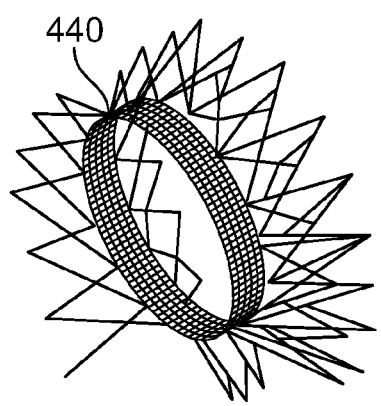
FIG. 8C shows the intermediate pin and cross joint spaceframe design around the MEPC.

FIGS. 7, 7A, 7B, and 7C illustrate an example of an initial 1D model of an integrated spaceframe 160 and MEPC compact drivetrain represented by the connections between the main shaft bearings 425, MEPC compact drivetrain torque band 440. As can be seen in FIG. 7, the distribution of torque from the torque band 440 is transferred to the spaceframe through pins or bridge structure coupled to the torque band. The bridging is shown for a spaceframe design before the inclusion of man-ways or ancillary equipment. The patterns of the rails, nodes, and pins, together with their specific design properties, are optimized using the results of successive 1D FEA calculations. Each of the calculation result are interrogated for the following major considerations:

- The overall weight of the spaceframe & MEPC compact drivetrain combination
- The global deflection between Point A and Point B, or alternately Point B'
- Max & near max local stress levels and locations in all of the rails & pins (bridge members)
- Max & near max local deflections and locations for all of the rails & pins
- Min & near min local stress levels and locations in all of the rails & pins
- Min & near min local deflections and locations for all of the rails & pins The results of each 1D FEA calculation are used to make design changes to the next calculation model, in alignment with the optimization criteria. This optimization process may be utilized with digital automation. Digital automation may provide accurate and timely design of a specific spaceframe and integrated MEPC compact drivetrain design.

FIGS. 8, 8A, 8B, and 8C illustrate an example of the more refined intermediate spaceframe model including pin and cross joint after a number of 1D FEA optimization cycles represented by the connections between the main shaft bearings 425, MEPC compact drivetrain torque band 440. Other required design features, such as the fore and aft personnel floors 810, 820, respectively, are added to the model, as well as the interior main shaft bearing 425 and MEPC torque band 440 to further enhance the overall spaceframe optimization criteria.

Figure 9:
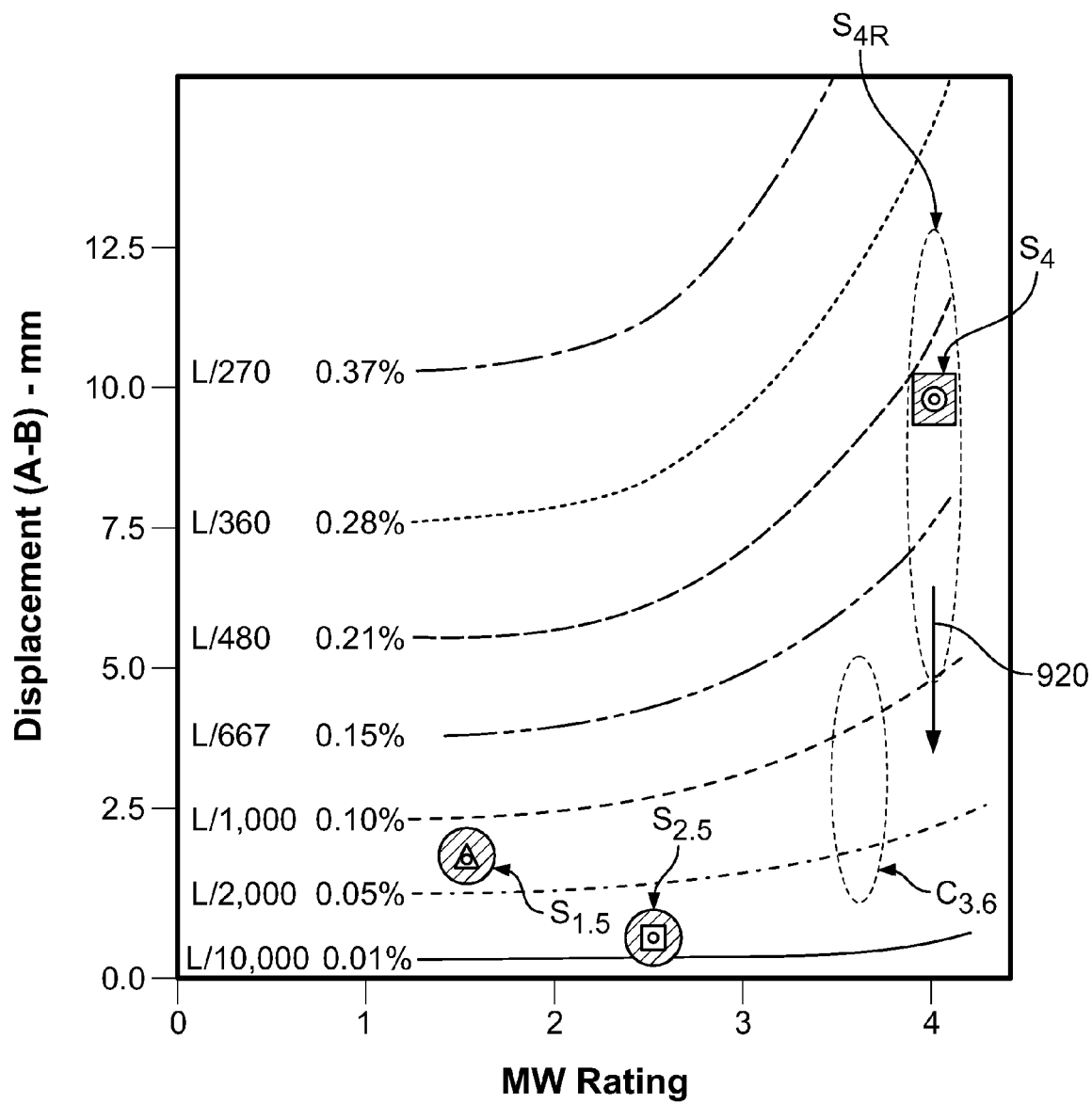
FIG. 9 shows the relationship between the relative stiffness and MW size for conventional heavy bedframe nacelle versus an exemplary 4 MW intermediate optimized integrated spaceframe and compact drivetrain design.

FIG. 9 shows the relationship between spatial displacement and MW Rating for both conventional bedframe and spaceframe turbines for an example maximum load case. The displacement between Point A an Point B as a function of MW Rating is a good indicator of the stiffness of the turbine bedframe or spaceframe. Conventional turbine designs have resulted most frequently in displacements ranging between about 0.01% and about 0.10%. A range of displacement for a conventional bedframe design for a 3.6 MW turbine is shown at $C_{3.6}$. As is shown in FIG. 9, the estimated level of stiffness for a 1.5 MW spaceframe design $S_{1.5}$ is between about 0.05% and about 0.10%, and the estimated level of stiffness for a 2.5 MW spaceframe design $S_{2.5}$ is between about 0.01% and about 0.05%. The range of stiffness for a 4 MW spaceframe design is shown at S4R, and a specific spaceframe design before optimization is shown at S4. The arrow 920 indicates the inclusion of conventional added weight or the use of torque stiffening included as part of this disclosure in the spaceframe design. In other words, by using heavier steel sections and/or more elements, the final stiffness of the spaceframe design could be driven to the approximate range of the existing bedframe construction, but this would result in a spaceframe that is heavier and more costly. The stiffness for the spaceframe may also be optimized for a lighter design point, taking into account the deflection of the spaceframe relative to the overall deflections for the wind turbine. In one embodiment, as discussed later, the MEPC operational torque may be used to "stiffen" the spaceframe in lieu of adding heavier sub-structures or adding material having an increased modulus.

Additional cycles of design optimization include the "bridges" between the drivetrain elements and the spaceframe. These bridges or "pins" carry the drivetrain operational loads into the spaceframe. To minimize spaceframe loads from being transmitted into the drivetrain, these pins are arranged as an internal circumferential "truss." They are uniformly spread around the circumference of the bearing supports and the MEPC compact drivetrain torque band, and new internal nodes in the radial space between the drivetrain and the interior of the spaceframe are used to vary the repeating pattern dimensions similar to the spaceframe optimization. They are also arranged to take advantage of the amount of "wheel-base" needed to minimize stresses and the overall relative deflection between the drivetrain and the spaceframe. These early calculation features are later replaced in the optimization process with stamped and punched metal sheet or plate, similar to the external spaceframe development.

Referring again to FIG. 8, the intermediate pin design is shown having pins which have a truss or lattice type of appearance. In the limit, if the loads are very high and/or the spaceframe rails are too light, the pin definition for each of the three-drivetrain locations would be driven to the extreme of crossing each other (and providing more opportunities for additional nodes). There is a trade-off for this in terms of the eventual internal access for personnel and components, the complexity for the transformation into the final sheet or framed plate metal or composite structure, and the overall weight and stiffness for the total combined structure.

Another important feature for the torque band pins or "bridging" (and therefore the eventual sheet or formed plate metal or composite spaceframe structure that replaces the 1D analysis pins) are their circumferential off-radial configuration. This design feature results in an overall stiffening of the integrated spaceframe and MEPC compact drivetrain casing for increasing levels of operational torque (wind turbine electrical output). The stiffening effect is due to the pins in compression exerting uniform outward force to the spaceframe wall, and this in-turn places the spaceframe wall into tension circumferentially, also known as "hoop stress." At the same time, the MEPC compact drivetrain is increasingly held firm and centered within the spaceframe.

Figure 10:
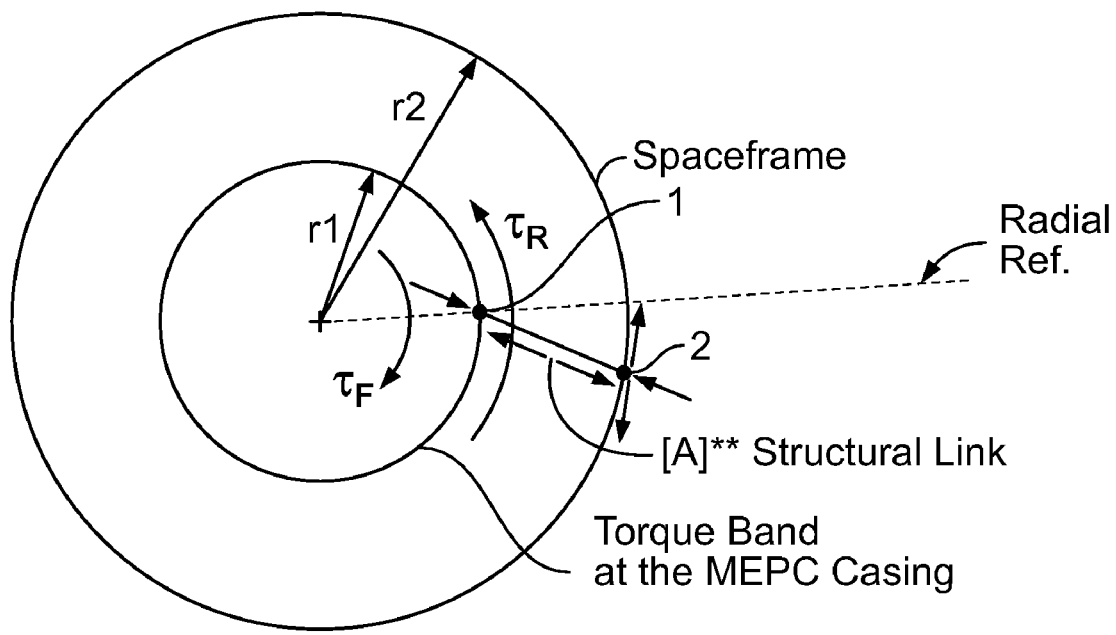
FIG. 10 illustrates the torque band concept and resulting circumferentially uniform stiffening of the spaceframe structure.

A simplified representation of a transverse cross-section of the spaceframe, at the MEPC torque band axial location (as viewed looking aft), is shown in FIG. 10. The MEPC torque band exterior radius (r1) and the spaceframe internal radius (r2) is bridged by pin structure [A]. When the wind turbine begins to produce power, the MEPC torque ($t_F$) is transmitted to the inner end (1) of pin structure [A]. The reaction torque ($t_R$) is manifested as compression in pin structure [A], and this in turn causes the outward loading of spaceframe at (2). Since there are a number of pin structures [A] equally spaced all around the circumference, the spaceframe resists this outward force equally all around and results in hoop tensioning in the spaceframe. The spaceframe becomes primarily circumferentially stiffer as the reactive torque increases with increasing levels of wind turbine power production.

Figure 11A:
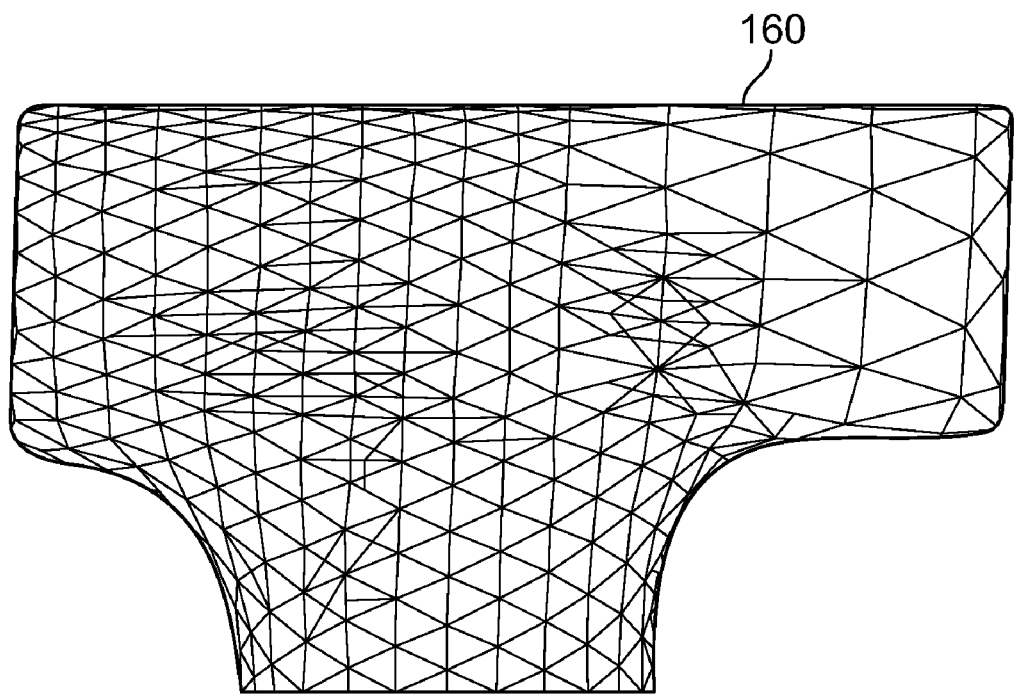
FIGS. 11A and 11B show the intermediate refined spaceframe design 1D model and a regional approach to optimizing areas of the spaceframe, respectively.
Figure 11B:
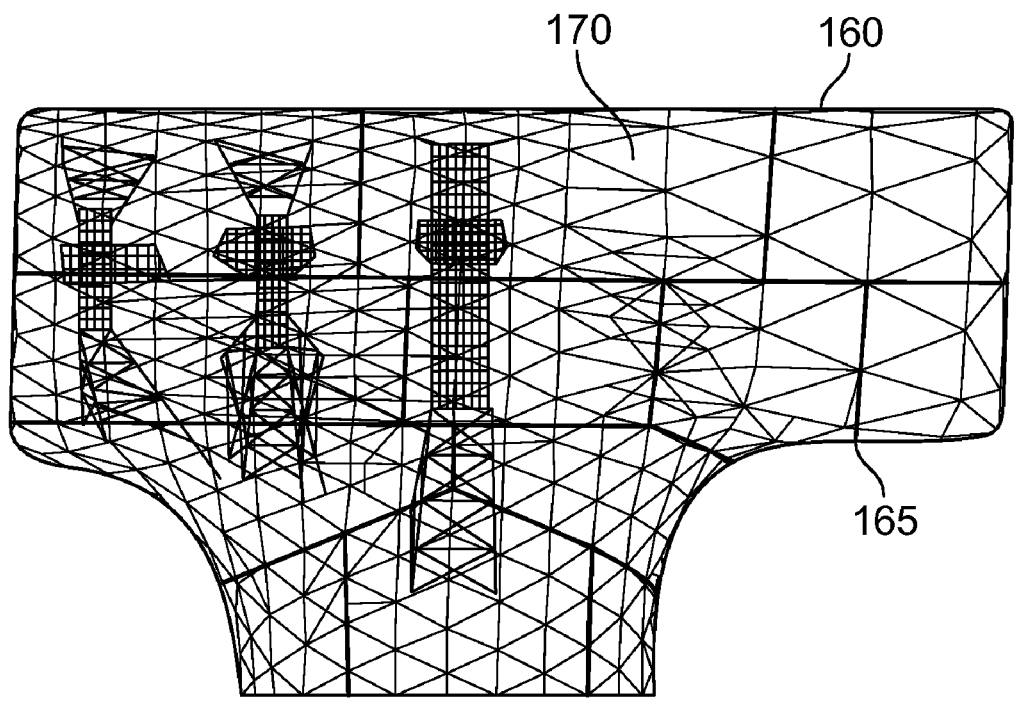

FIGS. 11A and 11B show the transition from the intermediate spaceframe design of FIG. 11A to a regional approach of groupings of the rails and nodes of FIG. 11B to begin the process of converting the design optimization model into a formed and joined sheet or plate metal structure. These regions can be grouped to vary rail dimensions, cross-sectional shape, material, or other properties to facilitate even further optimization for low weight. This is also used later in the design process to help guide the replacement of the rails and nodes with the formed, punched, stamped, and joined sheet, plate metal, or composite panel type geometry 170 and configuration boundaries 165. These boundaries never coincide from layer to layer except at a point, another design aspect according to the present disclosure and introduced in paragraph above.

After completing the 1D modeling and optimization for the first order properties of the integrated spaceframe and MEPC compact drivetrain, the transformation into the sheet metal or composite definition can be initiated. The process starts by replacing "patches" of nodes and rails in the spaceframe with sheet metal or composite panels. This process is repeated, taking advantage of the side-to-side centerline symmetry, until the entire spaceframe is made up of the formed sheet or plate metal panels (all rails and nodes (tubes or extruded hollow shapes) used throughout the initial spaceframe design optimization process are replaced or eliminated at the end of this process). The sheet, plate metal or composite panels are designed with the following considerations:

Lowest cost material and manufacturing process specification

Maximum panel size for the sheet steel thickness and stamping complexity

- Minimum number of panels to ensure lowest part count and tooling costs
- Optimize the panel cross-section for the required properties
- Optimize the panel cross-section for the number of layers
- Individual sheet or plate thickness, stamped shape, and punched openings are selected for strength, stiffness, and highest overall total value for the customer and manufacturer
- The method & geometry required for multi-sheet welding
- Alternate embodiment for multi-sheet joining that incorporates glue
- The methods & geometry required for panel edge welding and joining
- Overall fatigue life requirements for sections, geometry, and overall finished assembly for all design load cases and operational extremes As part of the overall optimization for the best operational properties at the lowest cost, one of the most important design levers is the selection of the spaceframe construction material. The spaceframe may be constructed of metal, metal alloys, composites, polymers, and combinations thereof. In another embodiment, the spaceframe is constructed using metal alloys. In another embodiment, the metal alloy is an aluminum alloy or steel. In another embodiment, the integrated spaceframe and compact drivetrain uses the same steel materials found in today's automobile and truck industries. Some examples of sheet steel material used for automotive applications (see FIG. 12) include mild, dent resistant, high strength, and martensitic steels.

Mild Steel/Low Carbon Steel (MS) has excellent formability, manufacturability, and low cost. It's used in beams, channels, rails, pipe, and complex shapes.

Dent Resistant Steel (DRS) is low-carbon, higher strength, grade steel that can be used for structural components. DRS is typically used in car body-panels, hood, bumper, deck-lids & fenders.

High Strength Steel (HSS) is used in automotive body structures and supports where durability is the prime requirement. Complex shapes may be difficult to manufacture. Examples where it's been used include rocker panels, rails, crossbeams & members, and pillar inners & supports.

Heat-treatable/Martensitic Steel offers high strength-to-weight ratio (used to reduce weight for light-weight designs)—But it's expensive. Uses include door intrusion beams, bumper reinforcement beams, springs & clips.

Figure 12:
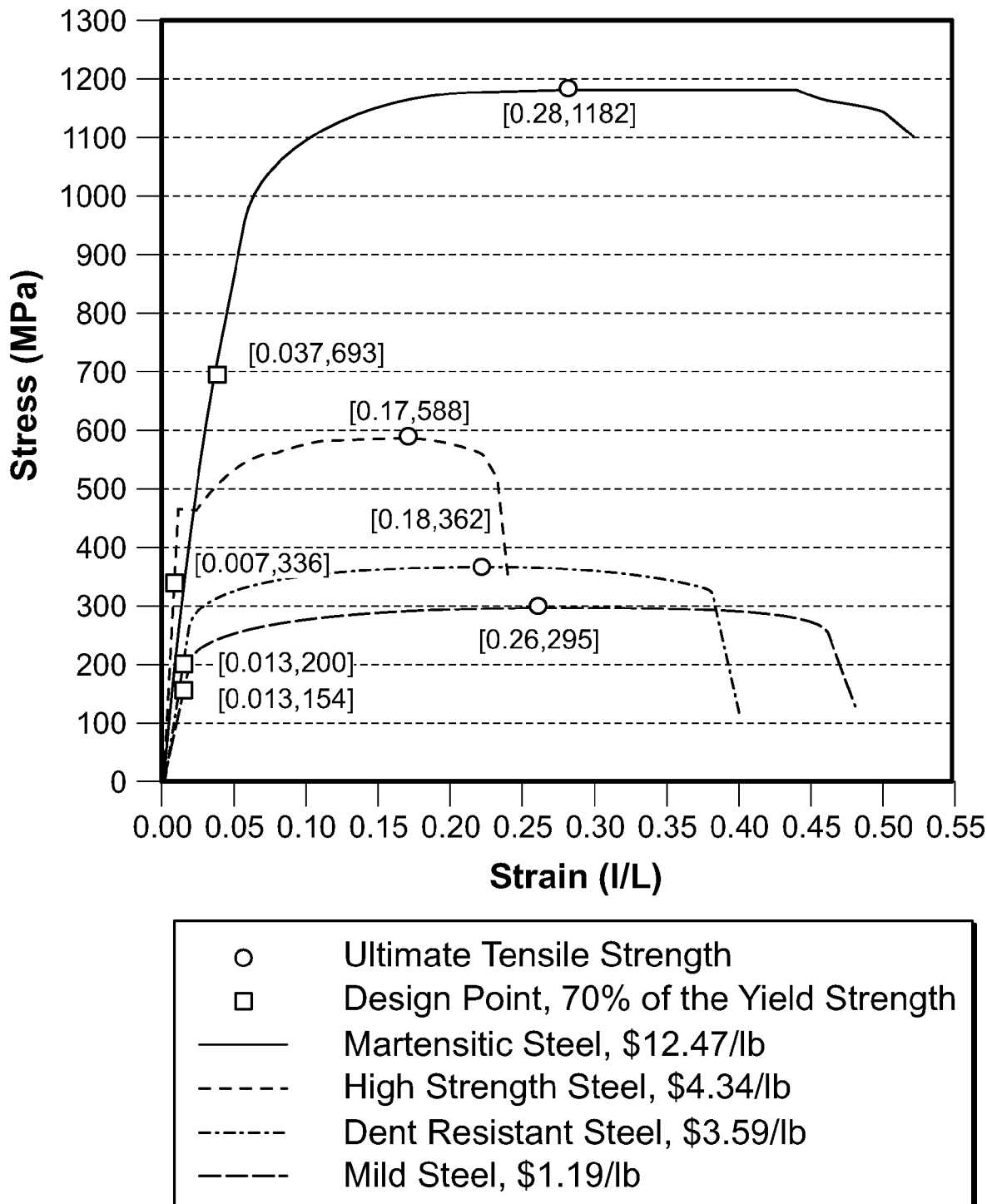
FIG. 12 is a summary of four potential spaceframe stamped and punched metal sheets or plate material and an exemplary range of strength, deflection, and finished cost properties.

FIG. 12 summarizes these four basic materials and shows the range of strength and deflection properties, as well as approximate 2007 costs, for the finished product stamped and punched sheet steel stock. Other materials may be used in the spaceframe construction. For example, medium carbon steel, high carbon steel, alloy steels, titianium and titanium alloys may also be used for the spaceframe construction. The alloy steels may include alloy steels including Cr, Ni, Si, and Mn. In another embodiment, combinations of different materials may be used to construct the spaceframe. For example, the spaceframe may utilize high alloy, high strength steel in higher stress regions and low alloy, low strength, and less expensive steel in lower stress regions.

Fatigue life capability and attention to the welded and/or mechanically joined assembly joints for the final sheet or plate metal definition of the integrated spaceframe and MEPC compact drivetrain design are also considerations in selecting a particular spaceframe design material. The sheet or plate metal thickness for the wind turbine spaceframe application is estimated to be nominally two or three times greater then that used in today's heaviest automotive applications, for example, 6-9 mm as compared to 2-3 mm. The successful fatigue life demonstrated for shapes and joining methods used in today's cars and trucks is expected to be transferable and relevant to the wind turbine spaceframe application.

During operation, the drivetrain and electrical systems generate heat that is accounted and managed in the design of the integrated spaceframe and MEPC compact drivetrain. The air inlets, passages, and outlets that carry conditioned air are integrated into the spaceframe structure. Also, other passages for electrical, mechanical, or ancillary fluid services are integrated into the spaceframe structure. These are done to enhance the strength and stiffness of the spaceframe through the creation of additional interior load carrying structures. This specific dual use feature of structural & electrical/fluid conveyance is unique for the wind turbine integrated spaceframe and MEPC compact drivetrain application.

Ergonomic considerations for worker safety, accessibility, and productivity are designed into the integrated spaceframe and MEPC compact drivetrain. During maintenance, the drivetrain and electrical systems must be accessed freely, and this includes the interior of the hub. Access to the interior of the hub from inside the spaceframe is not a new idea, however this design is unique for three specific features:

1. The hub access man-way is positioned in the axial view for the intra-blade locations of 12, 3:45, and 8:15 clock positions relative to the normal three positions corresponding to the number of blades. Alternate clock positions and numbers of openings are specific to the particular number of blades and spaceframe integrated compact drivetrain design.
2. The hub access man-way is integrated into the spaceframe structure, and is implemented while maintaining or enhancing the stiffness and strength of the overall design
3. In an alternate embodiment, the sheet metal or composite man-way doubles as a cooling air inlet and duct for the wind turbine In one embodiment, man-ways are integrated into the spaceframe structure using local design features that safely carry the loads for the rails or pins that are removed. Additional cross-members in any direction are made possible in most locations, and this helps maintain the original strength and stiffness of the overall spaceframe with the incorporation of additional smaller scale interior load carrying features for single or multiple man-ways. This specific multiple use feature (structural, personnel access, and thermal management/ancillary services) is considered unique for this wind turbine application. Interior clearances for servicing and replacement of components are accounted in the dimensional design of the interior of the spaceframe. Also included are provisions for repair or replacement of major components.

Figure 13A:
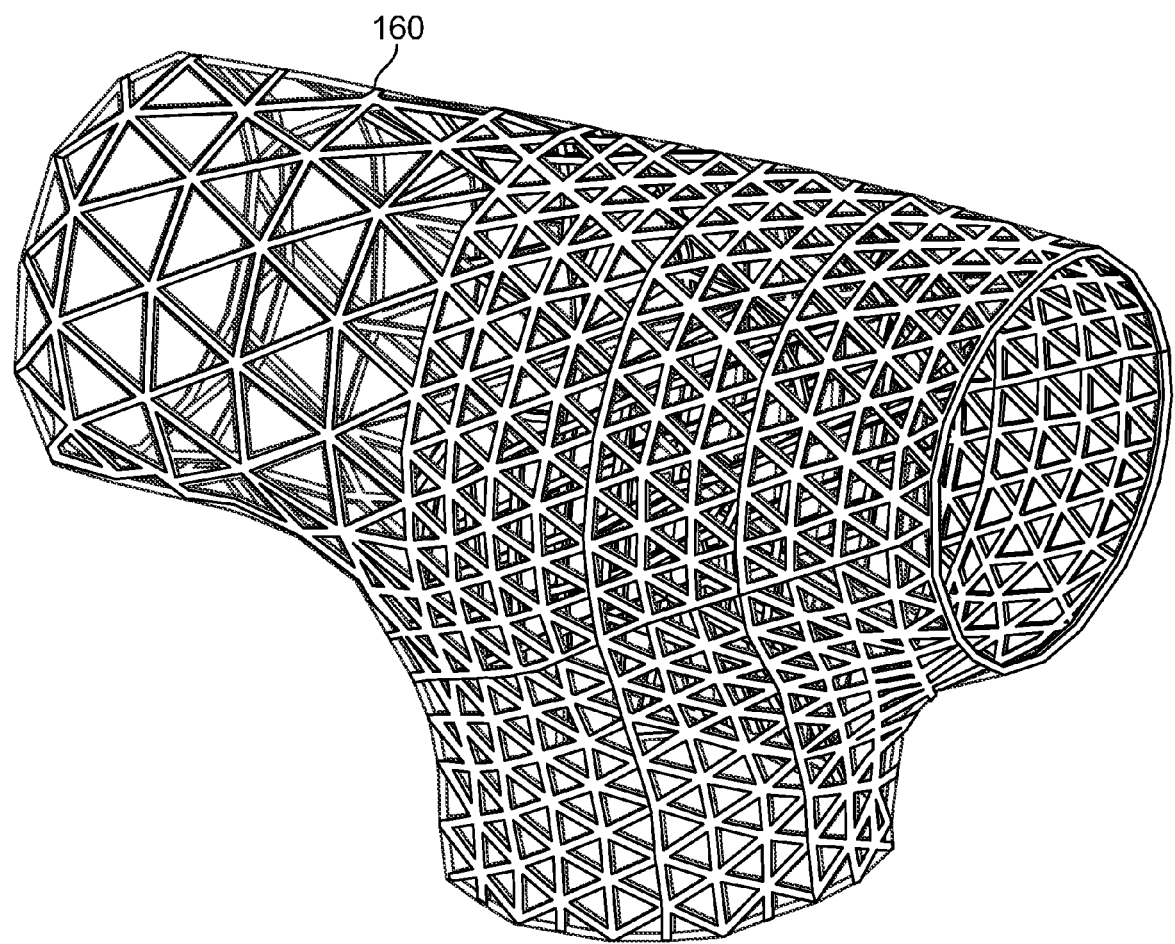
Figure 13D:
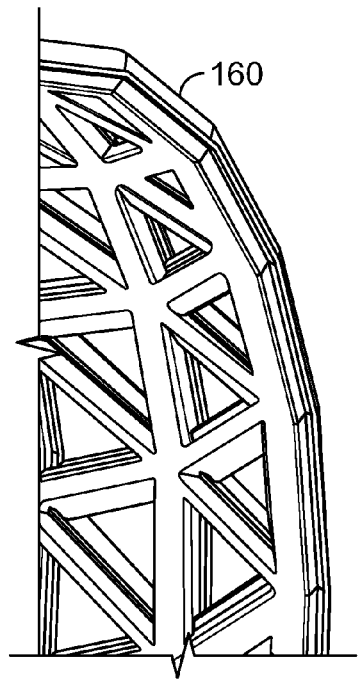
Figure 13D:
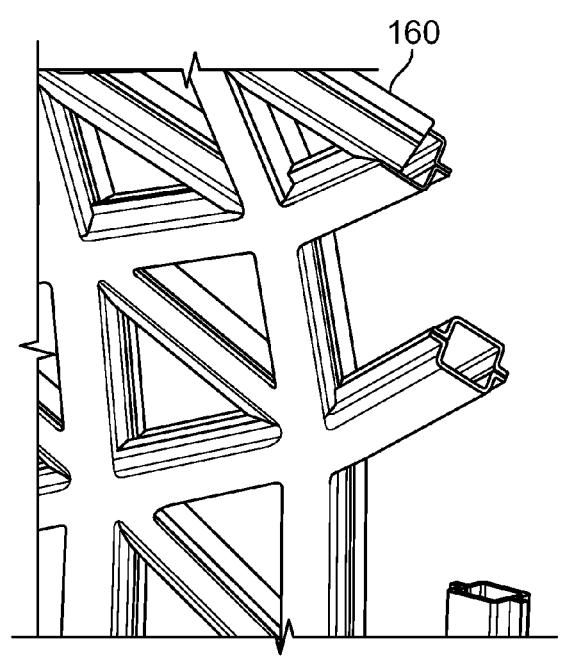
Figure 13D:
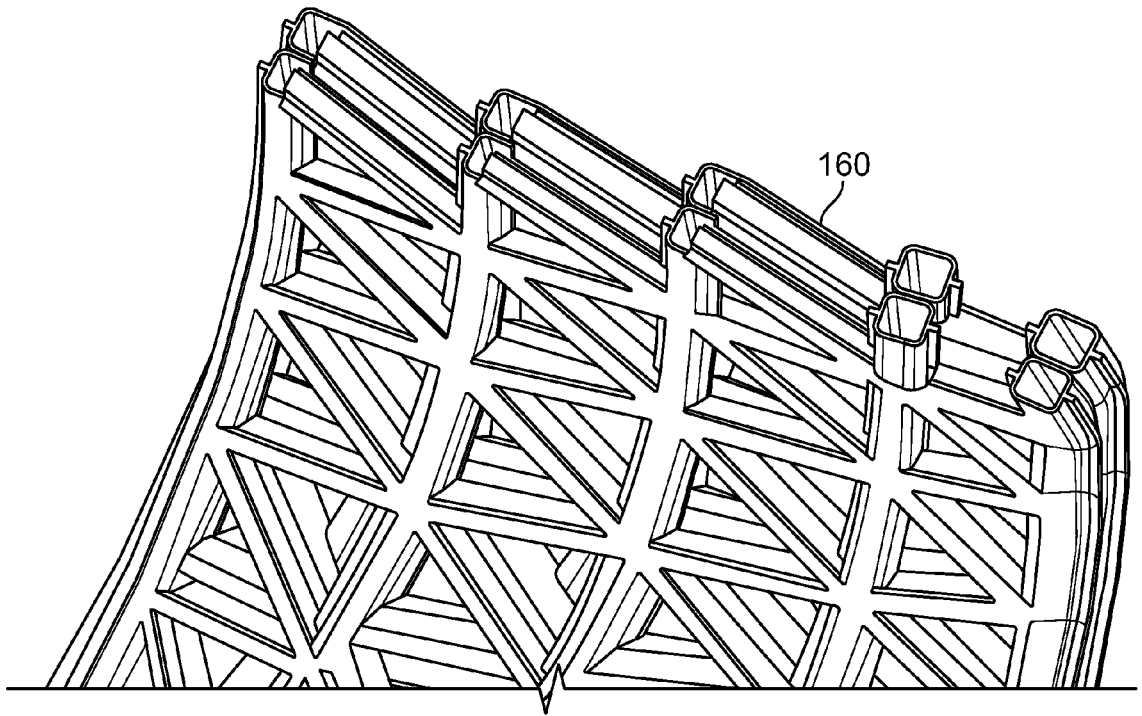

FIGS. 13A, 13B, 13C and 13D show an exemplary spaceframe 160 according to the present disclosure. FIG. 13A shows a spaceframe region 1310 transitioning to another adjacent spaceframe region 1320. The adjacent spaceframe region 1320 may be formed of a different material, different material thickness, different cross-section form or combinations thereof as compared to the spaceframe region 1310. FIG. 13B shows a cut-away of two stamped sheet or plate metal panel members that are fusion or solid state welded or mechanically joined together to form a box section 1330. FIG. 13D shows an example of an alternative embodiment of a multiple layer or doubled-up spaceframe wall region that could be optimized to mitigate high stress or excessive deflections.

In an alternate embodiment, the high degree of integration, coupled with the higher overall reliability resulting from the isolation of the component drivetrain from the rotor loads, results in a unique cost advantaged wind turbine product approach. In another embodiment, the integrated spaceframe and MEPC compact drivetrain is designed and considered so reliable, that the product life-cycle financial basis can assume complete unit replacement as the "repair" strategy. This would result in an even more compact and lighter/cheaper spaceframe than would otherwise be possible.

The integrated spaceframe and drivetrain design utilizes a weatherproof, durable, and cost effective fabric covering to provide the environmental protection of the drivetrain and up-tower interior components over the design life of the machine. For example, an architectural fabric covering may be used that provides twenty to thirty years of service. This fabric covering is also an excellent sound-dampening feature, because it is a very poor transmitter of mechanically stimulated acoustic emissions. The fabric will not contribute to machinery noise transmission into the spaceframe, and eliminates the possibility of "panel" vibration induced sound transmission to the outside environment.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A wind turbine, comprising:
a rotor;
a compact drivetrain coupled to the rotor; and
a spaceframe mounted atop a tower and integrated with the compact drivetrain,
wherein the spaceframe and compact drivetrain are configured to carry primary rotor loads and drivetrain torque to the tower, and
wherein the compact drivetrain is configured to transfer circumferentially uniform torque loads into the spaceframe.

2. The wind turbine of claim 1, wherein the spaceframe is formed of joined rails.

3. The wind turbine of claim 1, wherein the spaceframe is formed of joined panels.

4. The wind turbine of claim 1, wherein the spaceframe is formed of a material selected from the group comprising metal alloys, composites and polymer materials.

5. The wind turbine of claim 4, wherein the material is a metal alloy selected from the group comprising aluminum alloys and steels.

6. The turbine of claim 1, wherein a man-way is integrated into the spaceframe.

7. The wind turbine of claim 1, wherein the spaceframe is covered with an architectural fabric, a weatherproof material, or combinations thereof.

8. A spaceframe for housing a wind turbine drivetrain, comprising:
a structure configured to transfer drivetrain torque and primary rotor loads to a support structure, wherein the structure is configured to receive circumferentially uniform torque loads into the structure from a drivetrain.

9. The spaceframe of claim 8, wherein the support structure is a wind turbine tower.

10. The spaceframe of claim 8, wherein the structure comprises joined rails.

11. The spaceframe of claim 8, wherein the structure comprises joined panels.

12. The spaceframe of claim 8, wherein the structure is formed of a material selected from the group comprising metals, metal alloys, composites, and polymer materials.

13. The spaceframe of claim 12, wherein the material is a metal alloy selected from the group comprising aluminum alloys and steels.

14. The spaceframe of claim 8, further comprising a man-way is integrated into the structure.

15. The spaceframe of claim 8, further comprising an architectural fabric, a weatherproof material, or combinations thereof covering the structure.

16. The spaceframe of claim 8, further comprising:
an integrated compact drivetrain integrated with the structure.

* * * * *